United States Patent [19]
Hoff et al.

[11] Patent Number: 5,285,634
[45] Date of Patent: Feb. 15, 1994

[54] AIRCRAFT GAS TURBINE ENGINE CONTROL

[75] Inventors: Richard W. Hoff, Glastonbury; Barry I. Priest, East Hartford, both of Conn.

[73] Assignee: United Technologies Corporation, Hartford, Conn.

[21] Appl. No.: 803,854

[22] Filed: Dec. 9, 1991

[51] Int. Cl.$^5$ ................................ F02C 9/28
[52] U.S. Cl. ................... 60/39.161; 60/39.281
[58] Field of Search ............... 60/39.161, 39.281, 243; 364/431.02

[56] References Cited

U.S. PATENT DOCUMENTS

| | | | |
|---|---|---|---|
| 4,432,201 | 2/1984 | Hawes | 60/39.281 |
| 4,449,360 | 5/1984 | Evans | 60/39.281 |
| 4,500,966 | 2/1985 | Zagranski et al. | 364/431.02 |
| 4,507,915 | 4/1985 | Evans | 60/39.281 |
| 4,625,510 | 12/1986 | Evans | 60/39.161 |
| 5,072,578 | 12/1991 | Moore | 60/39.281 |

Primary Examiner—Louis J. Casaregola

[57] ABSTRACT

A normal acceleration schedule limits the rate of engine acceleration A second acceleration schedule permits a higher acceleration, which causes higher thermal stress in the hot engine parts. The higher schedule is enabled only during a landing approach, thus limiting the number of such stress cycles, while achieving improved performance for the selected mode.

11 Claims, 2 Drawing Sheets

AIRCRAFT GAS TURBINE ENGINE CONTROL

DESCRIPTION

Technical Field

The invention relates to aircraft engines and in particular to a dual acceleration schedule control system for such engines.

Background of the Invention

Gas turbine engines are operated in response to a demand input. The input demand modifies the fuel flow producing a change in the engine output. Various known control limits place limits on the range of operation and the rate of load change.

Adequate compressor surge margin is provided and the engine material is protected from extreme temperature levels. During a load change thermal transients occur. When part of the engine responds thermally, more rapidly than other parts, differential expansion occurs. This can produce rubbing or thermal stresses in connecting structure.

A rapid temperature change causes the exposed surface of a component to expand before the rest of the component. This leads to thermal stresses within the component during the transient. Generally there is no immediate failure, but fatigue damage occurs as a function of the extent of the strain and the number of cycles.

The aircraft and engine must meet specified response time performance for certification and safe operation. The engine is designed and/or selected to meet these requirements while maintaining a long operating life. It is sometimes desirable to provide an even more rapid response of the engine and aircraft for certain conditions.

The prior art approach of changing the preselected acceleration schedule to a higher schedule meets this need. However, this leads to the use of the more rapid schedule al of the time. A more rapid response increases the thermal stress for each cycle. Since this prior art response now occurs for all operating conditions, the number of extreme cycles increases to significantly reduce engine hot section life.

SUMMARY OF THE INVENTION

A basic acceleration schedule limits response of the engine for all normal conditions, but meets certification regulations and provides safe operation. During landing approach it would be desirable to quickly correct a glide path error. If a go-around is required, it would also be desirable to have a more rapid response.

A second more rapid acceleration schedule is provided. Control restrictions permit the intercession of this schedule only in the approach and the go-around conditions.

A first acceleration schedule is provided and also a second acceleration schedule which establishes a higher permitted engine acceleration than the first schedule. An approach condition satisfied signal generator produces a signal when the approach conditions are satisfied. The use of the second higher acceleration schedule is permitted only in the presence of the approach conditions satisfied signal. The second schedule is further permitted only in the additional presence of a pilot lever in forward signal, a sufficient engine speed signal, and a within proper altitude range signal.

DESCRIPTION OF THE PREFERRED EMBODIMENT

Figure 1:
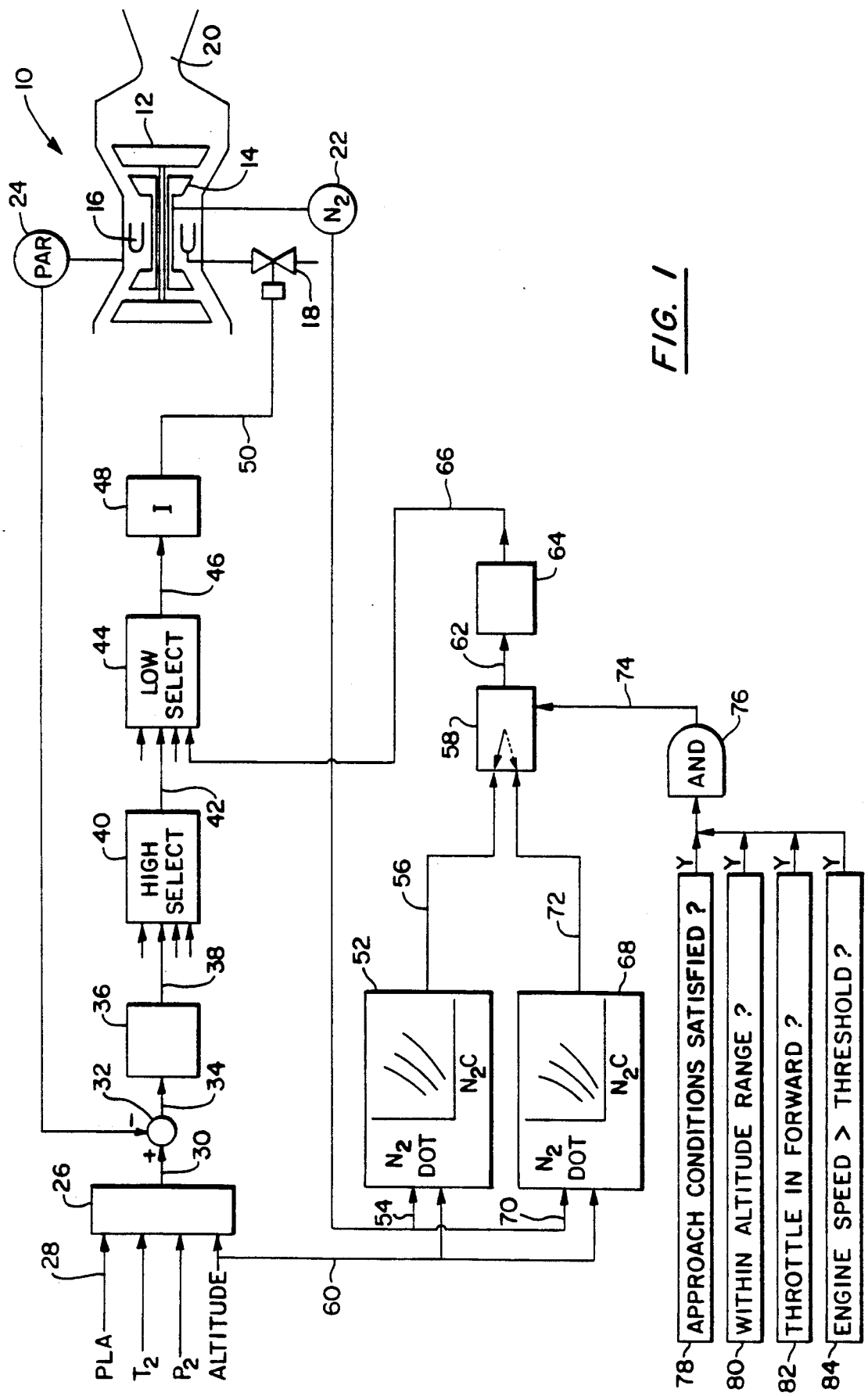
FIG. 1 is a schematic of the control systems.

Referring to FIG. 1 there is illustrated a gas turbine engine 10 with a low pressure rotor 12 and a high pressure rotor 14. Combustor 16 receives fuel the flow of which is modulated by valve 18. Exhaust gas produces thrust by passing through exhaust nozzle 20.

An engine speed sensor 22 senses the speed of the high pressure rotor 14. Parameter sensor 24 senses the parameter which is to be primarily controlled. This is preferably the engine pressure ratio or low pressure rotor speed (N1).

Controller 26 receives a demand signal from the pilot power lever angle 28 as well as other conditions such as inlet temperature and pressure and altitude. This produces a power setting parameter reference which passes through line 30 to comparison point 32. It is here compared to the sensed parameter 24 sending an error signal representing the power error through line 34. Compensation logic 36 transfers this to a rate signal such as pounds fuel per hour per second, passing this signal through line 38 to a high select logic 40. It is here compared to other signals such as minimum allowable engine speed with the selected signal being sent through line 42 to low select logic 44.

The selected low fuel flow rate signal such as pounds fuel per hour per second is sent through control line 46 to integrator 48 where it is transformed to a requested flow such as pounds fuel per hour. This signal passes through line 50 to control valve 18.

On occasions the demand signal may be automatically established. This can happen, for instance, when a low engine speed is detected. Response is the same as it is to the PLA.

In the conventional control system one of the signals entering the low select logic 44 has an output from an acceleration schedule. Here, however, two acceleration schedules are provided as described below with the low schedule being normally used and the high schedule being selected only under specific conditions.

The low acceleration schedule 52 is used during all normal operation. Here, an engine speed signal (N2) enters through line 54 and a resulting permitted acceleration signal (N2 dot) passes through line 56 to switch 58. The engine speed signal is usually a corrected speed signal. The mechanical speed has been corrected for either a measured or synthesized temperature in the engine.

This schedule may be corrected where appropriate with altitude signal 60. Under normal operating conditions switch 58 selects this signal from line 56 passing a signal through line 62 representing an allowable RPM per second. Compensator 64 transfers this into a pounds fuel per hour per second signal passing through line 66 to the low select 44. This produces an allowable engine acceleration signal which limits acceleration of the engine during all normal conditions.

Since the other limits entering into low select 44 are most often above the signal, the engine effectively operates with this acceleration schedule most of the time. A second acceleration schedule 68 is a high schedule permitting more rapid acceleration This schedule is selected to provide more rapid acceleration during certain selected flying conditions with the recognition that increased thermal stresses to the engine will occur.

As with the first acceleration schedule, an N2 signal enters through line 70 and an allowable acceleration rate signal exits through line 72 passing to switch 58. Switch 58 receives a signal from line 72 only in the presence of a positive signal through line 74 passing through AND gate 76.

Approach conditions satisfied logic 78 sends a signal to the AND logic 76 only when approach conditions are satisfied. These conditions are those normally specified by the aircraft designer These may include slat settings, flap settings, landing gear configuration, or other similar factors.

Where this is used as the only condition, the AND gate 76 would be satisfied (or not even necessary) and the high acceleration schedule selected. This then substitutes for the low acceleration schedule the high schedule within low select logic 44.

In order to minimize the operation of the engine on the high acceleration schedule, additional conditions should be met before the switch to the more rapid acceleration is permitted. Logic box 80 checks to see that operation is within a preselected altitude range. This altitude range is based on the takeoff altitude envelope within which approach to an airport or a possible go-around may be expected. Logic box 82 checks to see that the throttle is in the forward position, thus preventing the use of the higher acceleration schedule during reverse thrust braking during landing to avoid the increased thermal stresses associated with the higher acceleration schedule An engine speed greater than a threshold speed logic 84 is also checked to assure that the engine is operating at sufficient speed to avoid an engine compressor surge or stall on this more rapid acceleration.

Sensed parameters other than engine speed may be used in conjunction with the dual acceleration schedules. Other possible parameters include the fuel flow to burner pressure ratio, and the exit gas temperature.

Figure 2:
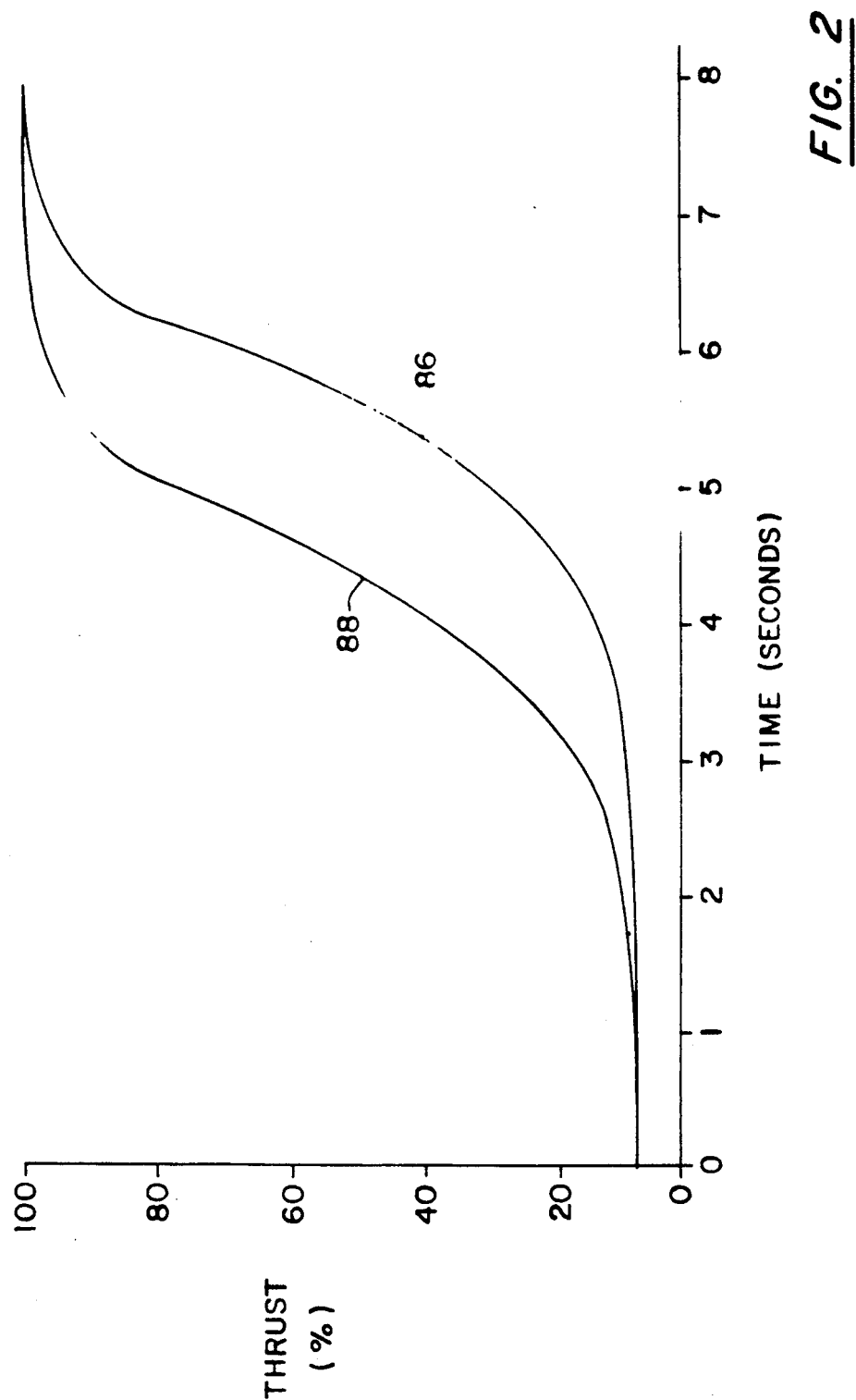
FIG. 2 is a curve showing the thrust versus time for each acceleration schedule.

In FIG. 2 curve 86 illustrates the percent thrust versus time in seconds of the normal low schedule. Curve 88 represents the thrust versus time operation of the engine operating on the high acceleration schedule. Use under this condition to correct a glide path is expected to be substantially for about a 5 second period. With this high acceleration existing in the order of 5 seconds, a somewhat higher thermal transient exists than normal. This is relatively infrequent compared to other operation and furthermore does not exist throughout the full potential time scope of the transient.

On the occasion where a go-around is required, this higher acceleration will extend for a longer time and an even higher thermal stress will be incurred with somewhat more fatigue damage potential. Such operation is, however, quite rare and very few of such cycles will occur.

The ability to react with rapid acceleration is obtained for preselected operating modes Such acceleration is restricted to a lower, but safe level for all other operating modes. The higher thermal stress accompanying the more rapid acceleration occurs only when in the preselected mode, thereby reducing the number of extreme cycles. This increases the engine hot section life.

What is claimed is:

1. An aircraft gas turbine system comprising:

a first acceleration schedule establishing an allowable engine acceleration signal as a function of a sensed engine parameter;

a second acceleration schedule establishing a higher engine acceleration signal as a function of said sensed engine parameter;

an approach conditions satisfied signal generator producing an approach signal indicating approach conditions satisfied;

an altitude sensor producing an altitude signal;

a pilot power lever angle signal producing a forward or reverse signal;

an engine speed sensor producing a sensed engine speed signal;

an engine power demand means for producing a power demand signal;

a demand signal limiter for limiting said demand signal in response to a limit from one of said acceleration signals;

an acceleration schedule selector for selecting a selected acceleration schedule from one of said first and second acceleration schedules;

said acceleration schedule signal selector selecting said second acceleration schedule signal only in the presence of an approach condition satisfied signal; and transmitting means for transmitting said selected signal to said demand signal limiter.

2. A control system as in claim 1 comprising also:
said sensed engine parameter being sensed engine speed.

3. A control system as in claim 2 comprising also:
said gas turbine engine having a high pressure rotor and a low pressure rotor; and
said sensed engine speed being the sensed speed of said high pressure rotor.

4. A control system as in claim 1 comprising also:
said acceleration schedule selector selecting said second acceleration schedule only in the additional presence of a forward pilot power lever angle signal.

5. A control system as in claim 4 comprising also:
altitude comparison means for comparing said sensed altitude with the preselected altitude range, and producing a within altitude range signal; and
said acceleration schedule selector selecting said second acceleration schedule only in the additional presence of said within altitude range signal.

6. A control system as in claim 2 comprising also:
a speed comparison means for comparing said sensed engine speed to a preselected minimum engine speed, and producing a sufficient speed signal when said minimum speed is exceeded; and
said acceleration schedule selector selecting said second acceleration schedule only in the additional presence of said sufficient speed signal.

7. A control system as in claim 2 comprising also:
said acceleration schedule selector selecting said second acceleration schedule only in the additional presence of a forward pilot power lever angle signal.

8. A control system as in claim 7 comprising also:
altitude comparison means for comparing said sensed altitude with the preselected altitude range, and producing a within altitude range signal; and
said acceleration schedule selector selecting said second acceleration schedule only in the additional presence of said within altitude range signal.

9. A control system as in claim 8 comprising also:
   a speed comparison means for comparing said sensed engine speed to a preselected minimum engine speed, and producing a sufficient speed signal when said minimum speed is exceeded; and
   said acceleration schedule selector selecting said second acceleration schedule only in the additional presence of said sufficient speed signal.

10. A control system as in claim 1 comprising also:
    said approach conditions satisfied signal including flaps or slats in proper position signal.

11. A control system as in claim 10 comprising also:
    said approach conditions satisfied signal also including landing gear configuration signal in proper position.

* * * * *